No. 621,405. Patented Mar. 21, 1899.
J. A. GARRETT.
TRANSPLANTING TREE CLAMP.
(Application filed May 24, 1897.)
(No Model.) 2 Sheets—Sheet I.
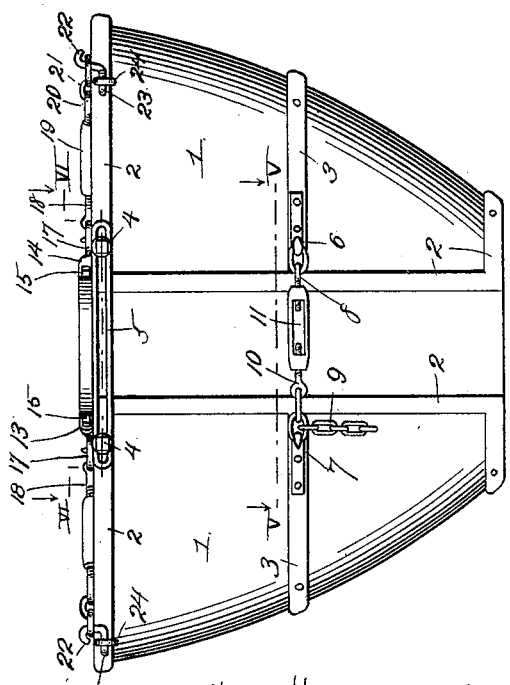
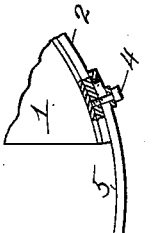
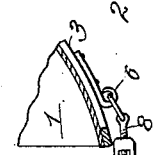
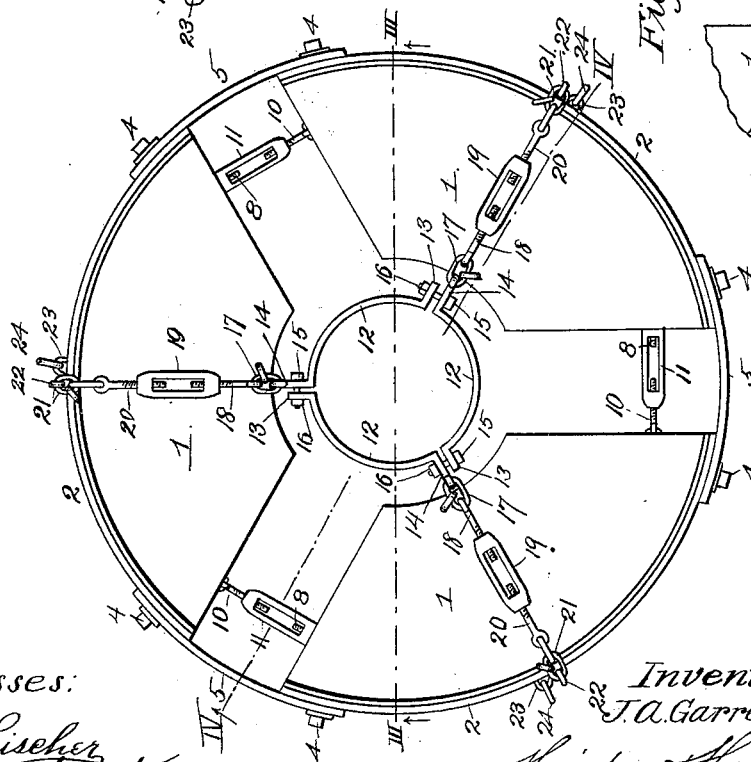
Witnesses:
F. G. Fischer
G. Y. Thorpe
Inventor
J. A. Garrett
By Higdon & Higdon
Attys.
THE NORRIS PETERS CO., PHOTO-LITHO., WASHINGTON, D. C.

No. 621,405. Patented Mar. 21, 1899.
J. A. GARRETT.
TRANSPLANTING TREE CLAMP.
(Application filed May 24, 1897.)
(No Model.) 2 Sheets—Sheet 2.
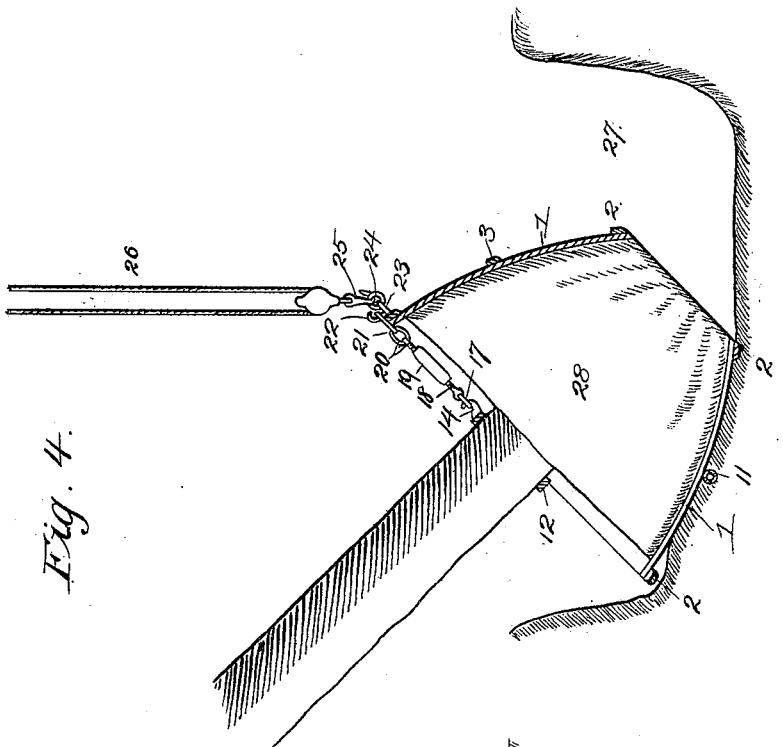
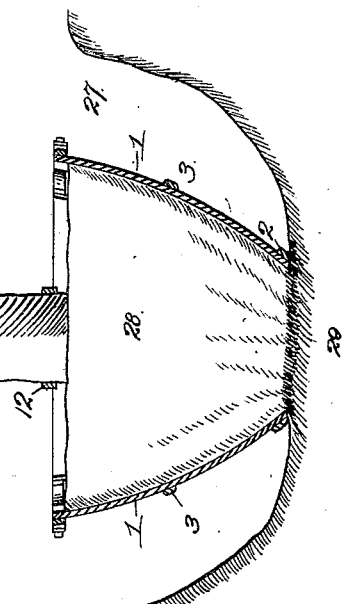
Witnesses:
F. G. Fischer
G. K. Thorpe
Inventor
J. A. Garrett
By Higdon & Higdon
Attys.
THE NORRIS PETERS CO., PHOTO-LITHO., WASHINGTON, D. C.

UNITED STATES PATENT OFFICE.

JOHN ALBERT GARRETT, OF KANSAS CITY, MISSOURI.

TRANSPLANTING TREE-CLAMP.

SPECIFICATION forming part of Letters Patent No. 621,405, dated March 21, 1899.

Application filed May 24, 1897. Serial No. 637,935. (No model.)

*To all whom it may concern:*

Be it known that I, JOHN ALBERT GARRETT, of Kansas City, Jackson county, Missouri, have invented certain new and useful Improvements in Transplanting Tree-Clamps, of which the following is a full, clear, and exact description, reference being had to the accompanying drawings, forming a part thereof.

My invention relates to transplanting tree-clamps; and my object is to produce a device of this character whereby trees of any size may be transplanted without injury and in an expeditious manner.

A further object of the invention is to produce a tree-clamp of the character referred to which is simple, strong, durable, and comparatively inexpensive of manufacture.

The invention consists in certain novel and peculiar features of construction and combinations of parts, as will be hereinafter described and claimed.

In order that the invention may be fully understood, I will proceed to describe it with reference to the accompanying drawings, in which—

Figure 1 represents a plan view of a transplanting tree-clamp embodying my invention. Fig. 2 represents a side view of the same. Fig. 3 represents a cross-section taken on the line III III of Fig. 1 and showing the device in operative relation to a tree. Fig. 4 represents a section taken on the line IV IV of Fig. 1 and shows the position of the tree just after it has been lowered or is ready to be raised by a derrick or equivalent means. Fig. 5 represents a section taken on the line V V of Fig. 2. Fig. 6 represents a section taken on the line VI VI of Fig. 2.

In the said drawings, wherein similar reference-numerals designate corresponding parts, 1 designates three segmental plates, each forming a section of my improved tree-clamp when arranged relatively as shown in the drawings—that is to say, when arranged to taper downwardly and inwardly, so as to form between them a comparatively small circular opening, with radiating arms of greater or less width, accordingly as the clamp-sections are adjusted farther away from or nearer to each other. This will depend partly, of course, on the size of the tree to be transplanted and the spread of its roots. The depth of the clamp, also, will depend to some extent upon the size or kind of tree to be transplanted—that is to say, if a large tree or a small tree whose roots spread proportionately over a great area or depth is to be transplanted a clamp of a suitable size of course will be employed.

The clamp-sections 1 are of suitable metal, in the form of heavy plates, and are bordered marginally at their outer sides by the stiffening and strengthening strips 2, and they are also provided externally at about their middle with cross-strips 3. Near its upper outer corners each section is provided with a guide and clamping-bolt 4, and mounted upon the same and connecting the adjacent or opposing edges of the clamp-sections are the slotted links 5. By adjusting said links the diameter of the flared end of the clamp may of course be varied. Secured to the cross-strips 3, near their opposite ends, are eyebolts 6 and hooks 7, the eyebolt 6 of each clamp opposing the hook of the adjacent clamp. A bolt 8 is linked to each eyebolt 6, and a chain 9 is linked to a similar bolt 10, and said bolts are connected by the turnbuckles 11. When one of the links of each chain is engaged with its respective hook 7, it is obvious that the clamps are tied firmly and reliably together at their middle, and in order to adjust them so as to expand or contract the clamp the turnbuckles 11 are manipulated in the customary manner. Thus it will be seen that by the proper adjustment of the slotted links 5 and manipulation of the turnbuckles 11 the capacity of the clamp as a whole may be increased or diminished easily and expeditiously, so as to be applicable to trees of varying diameters.

When the clamp is contracted, the circular opening and its radiating arms hereinbefore referred to are reduced diametrically and narrowed, respectively, and when the clamp is expanded said opening is made larger and its arms are correspondingly widened.

The clamp-sections and their connections are adapted to encircle and embrace tightly the earth in which the roots of the tree are embedded, and in order to maintain the natural relation between such earth and the tree from the moment the tree is raised from its old till it is finally deposited in its new position I employ a tree-trunk ring or band and connect it securely with the clamp proper. This trunk ring or band embraces the tree-trunk near the surface of the ground and consists of three sections 12. Each section terminates at one end in a perforated ear 13 and a perforated hook 14, and the ear of one section is connected to the hook of the adjacent section by a bolt 15 and a clamping-nut 16. The hooks 14 are engaged by links of short chains 17, linked in turn to eyebolts 18, and said eyebolts are connected by turnbuckles 19 to eyebolts 20. The eyebolts 20 are linked by chains 21 to hooks 22, projecting from the upper horizontal strips 2 at the middle of the sections 1 of the clamp. Said hooks are bent to form eyes 23 and are secured rigidly to said strips, and engaging said eyes are rings 24 for engagement by a hook 25 of the lifting-tackle 26 of a derrick (not shown) or equivalent means.

In transplanting a tree an annular trench of suitable diameter, as at 27, is first dug around the tree, so as to leave standing and encircling practically all of the roots of the tree a conical core 28 of earth. This core is of substantially V shape, so as to leave at its lower end or apex a comparatively narrow or small neck 29 of earth, which must be broken before the tree can be removed. The clamp-sections are then arranged around said core of earth and are secured tightly up against it, so as to hold it firmly as an integral mass when the supporting-neck is broken. The trunk ring or band is also secured around the trunk and the turnbuckles 19 manipulated so as to form practically rigid connections between the clamp and said ring or band. Connection is now made to the tree at a suitable height by ropes or equivalent devices and the tree toppled over, as illustrated in Fig. 4. To accomplish this, of course sufficient power must be applied to break the small neck 29 of earth, and this is facilitated by the fact that the sharpened lower end of the clamp tends to cut through said neck. If the tree is of moderate size, a few men are able, usually, to pull it over to the position indicated; but if it is of large diameter it may be necessary to attach one or more teams to do the work.

In causing the tree to assume an inclined position care should be exercised that it be tilted in the line of one of the radial arms or spaces between a pair of clamp-sections in order that the ring 24 diametrically opposite may be vertically over the center of the tree and therefore in the line of draft when it is elevated. Otherwise when the tree was lifted it would tend to roll until the hook to which the tackle was attached came in line with the draft. By this rolling or twisting of the tree it might be materially injured. When the tree has assumed the proper inclined position, a derrick (not shown) is employed to lift it to a predetermined height. The hole from which the tree has been removed is then bridged over with heavy plank, and a wagon is driven thereon and disposed properly below the clamp. The tree is then lowered upon the wagon and the latter conveys it to its new position. The hole destined to receive the tree is of course planked over and the wagon driven thereon beneath a derrick, which is designed to lift the clamp a short distance above the wagon in order that the latter may be driven from beneath the tree. The planking is then removed, so as to uncover the opening, and the derrick manipulated to lower the tree to the position illustrated in Fig. 4, the bottom of the hole being formed, by preference, to "right" the tree as near as possible. Suitable connections are made with the tree at a proper height and men or teams then pull it until it assumes a vertical position. Sufficient earth is then filled in around it to steady it and hold it reliably in such position until the clamp can be removed, and then the hole is filled.

The above description is introduced simply to show that the tree, being necessarily subjected to a great many jars and jolts in its removal and transportation, must be firmly and reliably secured relative to the body of earth which its roots permeate.

It will thus be seen that an adjustable and yet strong and durable clamp is necessary to accomplish the purpose in view.

It is to be understood, of course, that various changes may be made without departing from the spirit and scope or sacrificing the advantages of my invention.

Having thus described the invention, what I claim as new, and desire to secure by Letters Patent, is—

1. A transplanting tree-clamp, comprising a plurality of segmental sections, adjustably connected together at their upper ends, each section being provided near one side margin with an eye and near the other with a hook, the hook of one section opposing the eye of the other, a bolt linked to each eye, a bolt chained to each hook, and a turnbuckle connecting said bolts, substantially as shown and described.

2. A transplanting tree-clamp, comprising a series of sections connected together, hooks 22 secured to the upper middle portions of said sections, eyebolts 20, chains 21, connecting eyebolts 20 and hooks 22, a trunk-ring composed of sections terminating at their opposite ends in lugs 13, and hooks 14, connections between the lug of one section and the hook of another, eyebolts 18, chains connecting the same with the hooks of said sections, and turnbuckles connecting the eyebolts 18 and 20, substantially as shown and described.

In testimony whereof I affix my signature in the presence of two witnesses.

JOHN ALBERT GARRETT.

Witnesses:
M. R. REMLEY,
G. Y. THORPE.